No. 702,204. Patented June 10, 1902.
F. A. E. HAMILTON.
HINGE JOINT FOR CONNECTING ROD SECTIONS.
(Application filed May 3, 1901.)
(No Model.) 2 Sheets—Sheet 1.

Witnesses Inventor

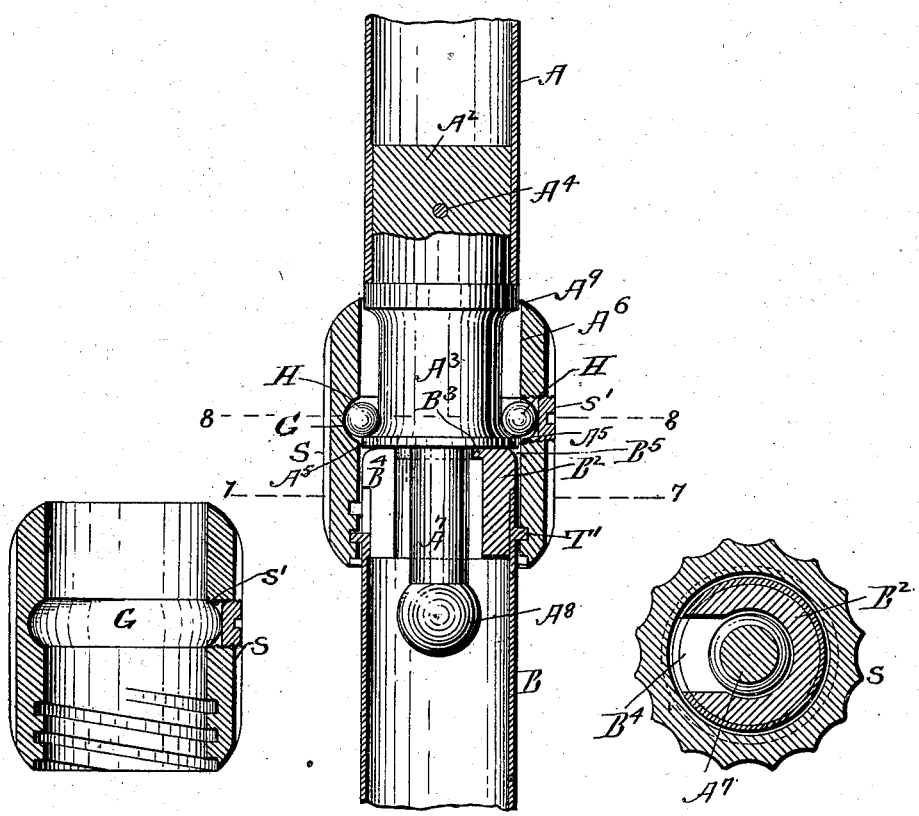

UNITED STATES PATENT OFFICE.

FREDERICK A. E. HAMILTON, OF BEVERLY, MASSACHUSETTS, ASSIGNOR, BY DIRECT AND MESNE ASSIGNMENTS, TO HENRY HUNT, OF BOSTON, MASSACHUSETTS.

HINGE-JOINT FOR CONNECTING ROD-SECTIONS.

SPECIFICATION forming part of Letters Patent No. 702,204, dated June 10, 1902.

Application filed May 3, 1901. Serial No. 58,673. (No model.)

*To all whom it may concern:*

Be it known that I, FREDERICK A. E. HAMILTON, of Beverly, in the county of Essex and State of Massachusetts, have invented a new and useful Improvement in Hinge-Joints for Connecting Rod-Sections, of which the following, taken in connection with the accompanying drawings, is a specification.

My invention relates to that class of joints that are used for connecting rods in such a manner that the joint may be rigid in its normal position or by a slight manipulation become a hinge and allow the parts to fold back.

My improved hinged joint is especially adapted for use in connection with beds, but may be employed for other purposes.

The objects are to so construct the joint that it may be to some extent self-locking, very secure when fully locked, and ornamental. These objects I attain by the construction shown in the accompanying drawings, in which—

Figures 1, 2:
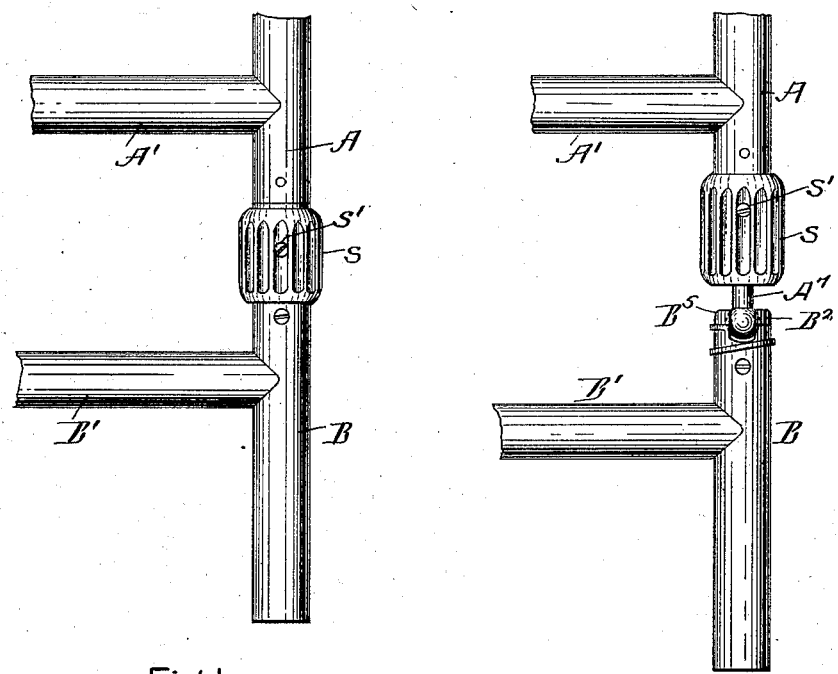
Figures 3, 4:
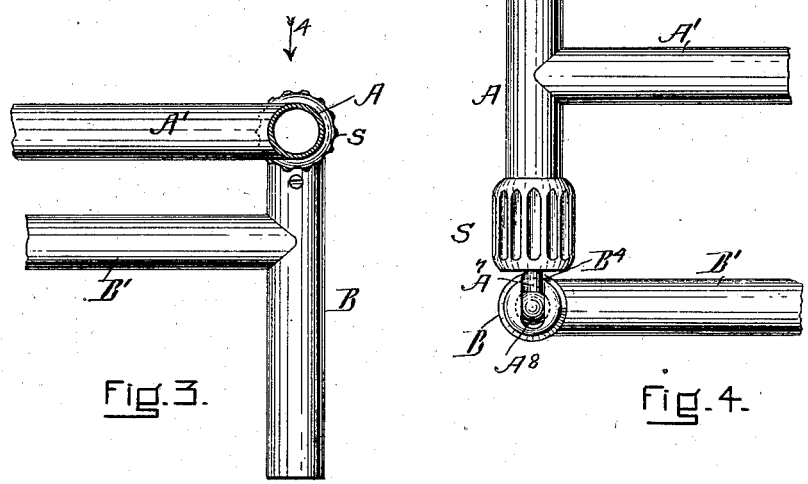

Figure 1 is an elevation showing one of my joints as applied to a bedstead. The joint is represented as locked. Fig. 2 shows the same as in Fig. 1, except that the joint is shown as unlocked. Fig. 3 is a plan view, the lower member being represented as turned at right angles or into a horizontal position. Fig. 4 is an elevation showing the parts in the same relation to each other as shown in Fig. 3 looking from the direction of the arrow 4. Fig. 5 shows in vertical section one of my joints. Fig. 6 shows in vertical section the outside member or locking-sleeve of my joint. Fig. 7 is a horizontal section taken on line 7 7 of Fig. 5. Fig. 8 is a horizontal section taken on line 8 8 of Fig. 5.

In Figs. 1, 2, 3, and 4 of the drawings I have illustrated my device as applied to a bedstead, the part B representing one leg and the part B' one of the connecting-bars, while the parts A and A' represent upper members of the bedstead.

The construction of the joint is more clearly illustrated in Figs. 5, 6, 7, and 8. The upper member A has attached to it by a pin or rivet $A^4$ a connecting ball-joint hinge-piece $A^2$ $A^3$ $A^7$. (See Fig. 5.) This hinge-piece has a broad annular groove $A^6$ extending around it and has a stop-flange $A^5$, as shown. The neck $A^7$ extends downward and terminates in a ball $A^8$, which works in a socket formed by the bushing $B^2$, attached to the top of the leg B. The bushing has a chamber in its center provided with a side opening $B^4$ and an inwardly-projecting flange $B^3$. The neck $A^7$ and ball $A^8$ are so arranged in connection with the chambered bushing $B^2$ that the part A may be raised up, as shown in Fig. 2, and the lower member turned at right angles, as shown in Fig. 4. It is evident that the lower member may remain in its perpendicular position and the upper member be turned, if desired. The construction would be the same in either case.

The sleeve S is made as shown and may be ornamented to any degree. This sleeve has on its inner side a groove G, adapted to receive antifriction-balls H. The balls H are put in (after the sleeve S is placed over the hinge-piece $A^2$ $A^3$) through a hole made for the purpose at S'. After the balls are put in the hole S' is closed by a screw-plug, as shown in Figs. 5, 6, and 8. These balls fit loosely in the groove G and also occupy a part of the annular groove $A^6$, formed on the hinge-piece, as indicated in Fig. 5. When the balls H are in place, they limit the up-and-down motion of the sleeve S. Thus if the sleeve is raised up the balls in the groove G will come in contact with the shoulder $A^9$ and not admit of further motion of the sleeve in that direction. On the other hand, if the sleeve is moved downward the balls will come in contact with the shoulder $A^5$, and thus prevent further motion in that direction.

A screw-thread T' is made on the part B and is adapted to engage with an internal screw cut in the sleeve S. The sleeve S fits very loosely onto the other parts, so that when the parts are perpendicular the sleeve will fall into engagement. Thus if the parts are in the position shown in Fig. 2 the sleeve S will fall onto the upper end of the part B $B^2$, (which is tapered off, as shown at $B^5$,) and thus hold the part A upright, although not screwed down. To make the joint firm and secure, the sleeve is turned so as to screw it down, and thus bring the parts together with a true union screw-joint.

I claim—

1. In a lock hinged joint; an upper member including a hinge-piece which has a neck extending downward and terminating in a ball; a lower socket member having a bushing adapted to receive said neck and ball, said bushing having an inwardly-projecting flange and a lateral opening; a sleeve adapted to move freely on the upper member, and to drop onto and engage with the said lower member whereby the two members are locked together, substantially as and for the purpose set forth.

2. In a lock hinge-joint; an upper member having a hinge-piece which has a neck terminating in a ball, and also has a broad annular groove adapted to receive antifriction-balls; a lower socket member adapted to receive said neck and ball; a sleeve having an annular groove also adapted to receive said antifriction-balls; antifriction-balls adapted to work in said grooves; and screw-threads upon said sleeve and lower member adapted to engage with each other and to lock the members together, substantially as and for the purpose set forth.

In testimony whereof I have signed my name to this specification, in the presence of two subscribing witnesses, on this 30th day of April, A. D. 1901.

FREDERICK A. E. HAMILTON.

Witnesses:
FRANK G. PARKER,
JOHN BUCKLER.